United States Patent Office 3,436,242
Patented Apr. 1, 1969

3,436,242
METHOD OF MAKING LUMINESCENT DIAL WITH RESIN AND FLUORESCENT TOP LAYER
Hubert Schaffner, Saint-Imier, Switzerland, assignor to Fluckinger & Cie, Saint-Imier, Switzerland, a Swiss body corporate
No Drawing. Filed Oct. 13, 1965, Ser. No. 495,732
Claims priority, application Switzerland, Oct. 19, 1964, 13,540/64
Int. Cl. C09k 1/12
U.S. Cl. 117—8                      4 Claims

ABSTRACT OF THE DISCLOSURE

An improved method for producing luminescent dial markers by arranging on a dial a layer of a luminescent product, covering the luminescent layer with a layer of a transluscent hardenable resin to which has been added a fluoroescent substance such as zinc sulphide and hardening the resin layer.

---

This invention relates to luminescent dial markers and to a method of producing such markers.

When using a luminescent product in which the energy source is a radioactive substance, for manufacturing dials with luminescent time markers, certain precautions have to be taken against the noxious effects of the radioactive rays emitted by the radioactive substance. Thus layers or bodies formed from such a luminescent product must have sufficient resistance and mechanical stability so as to reduce, as far as possible, the risk of their being damaged when the dials are handled. Inhalation of the dust produced when such bodies or layers are damaged or disintegrated due to insufficient mechanical stability, is extremely dangerous. It has in fact been noted that even substances which are the least dangerous due to their radiation, such as tritium for example, are extremely dangerous when absorbed by mouth. It is also preferable to avoid any contact between the persons handling the dials and the luminescent product, since, depending upon the radioactive substance used, such contact may be extremely dangerous to the system of these persons.

According to certain methods presently being used, the layers or bodies of the luminescent product are covered with a translucent, thermoplastic or thermosetting resin which, once it has hardened, provides excellent protection of the luminescent product and prevents any direct contact therewith. The presence of such a protective layer leads, however, to another disadvantage, namely to a weakening of the luminescence. This diminution of the luminescence results in an increase in the time required for adjustment of the eye, or in other words in the time required for perceiving the luminescence, particularly when passing from light to darkness. Furthermore, when the protective layer covers a body consisting, for example, of a mixture of a luminescent product and a transparent plastic material arranged in a recess, a further disadvantage may result, namely flaws in the appearance due to differences between the dimensions of the body and the corresponding recess.

The object of the present invention is to overcome the above-mentioned disadvantages by providing an improved method of manufacturing a dial with luminescent time markers, said method comprising arranging, on a dial, a luminescent product in the form of layers or solid bodies, such that each of the latter forms, at least indirectly, a part of a time marker, covering said bodies or layers with a layer of a translucent, thermoplastic or thermosetting resin, permitting said layer to harden, and machining the hardened layer to impart thereto the desired shape.

The improvement which constitutes the present invention consists in charging the translucent resin layer which forms the protective layer of the luminescent product with a fluorescent substance. This may be done either before or after the protective layer is deposited, but in any case before hardening occurs. Zinc sulphide may be used as the fluorescent substance, this being generally used in preparing luminescent products. The role of this fluorescent charge is to increase, by its fluorescence on passage from light to darkness, the luminosity due to the luminescent product, during the period of adaptation which is necessary for the eye to perceive the luminescence.

Thus, when a layer of translucent resin covering a luminescent product adapted to render a marker of a dial luminescent is prepared by the improved method according to the invention, it will not only fulfill the role of protection, which it assumes in the dials known hitherto but will also, due to its temporary fluorescence, render a marker immediately visible on passage from light to darkness. Furthermore, due to the fluorescent charge, it will make invisible any possible faults in the appearance of the dial, resulting from differences between the dimensions of the body formed from the luminescent product and of the recess thereof.

Thus a dial manufactured by the method according to the present invention presents advantages derived from the above mentioned characteristics.

We claim:
1. In a method of producing luminescent markers on a dial comprising mounting a self-luminescent material on selected portions of said dial and covering said self-luminescent material with a translucent protective layer of resin, the improvement which comprises charging said resin with a fluorescent substance before hardening of said layer.
2. A method according to claim 1, wherein said fluorescent substance is zinc sulphide.
3. A dial comprising a plurality of luminescent markers, each of said luminescent markers including a layer of a luminescent material and a layer of a hardenable translucent, resin containing a fluorescent substance said layer of hardenable translucent resin covering said layer of a luminescent material.
4. A dial according to claim 3 wherein said fluorescent substance is zinc sulphide.

References Cited

UNITED STATES PATENTS

| 3,033,797 | 5/1962 | De Leo et al. | 117—33.5 X |
| 2,950,222 | 8/1960 | Hinson | 117—33.5 X |
| 2,475,529 | 7/1949 | Switzer | 117—33.5 X |
| 2,395,185 | 2/1946 | Isenberg et al. | 117—33.5 |
| 2,389,781 | 11/1945 | Isenberg | 117—33.5 X |
| 2,084,526 | 6/1937 | Grenier | 264—21 |
| 1,488,240 | 5/1924 | Gulick | 117—8 |

ALFRED L. LEAVITT, *Primary Examiner.*

ALAN GRIMALDI, *Assistant Examiner.*

U.S. Cl. X.R.

58—50, 127; 117—33.5, 33.5, 45; 264—21